Feb. 5, 1957 E. G. F. ARNOTT 2,780,746
INCANDESCENT-ELECTROLUMINESCENT LAMP
Filed Oct. 1, 1953
FIG. 1.
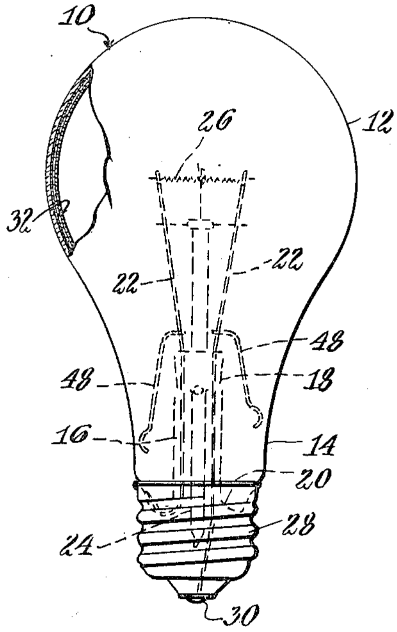
FIG. 2.
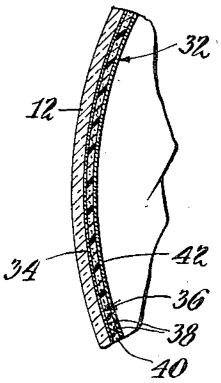
FIG. 3.
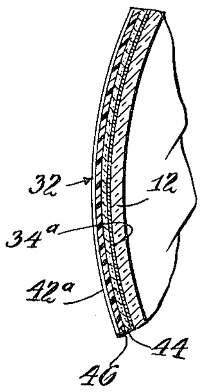
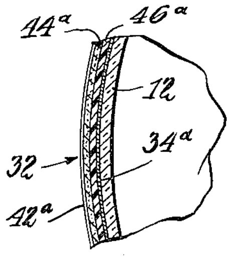
FIG. 6.
FIG. 4.
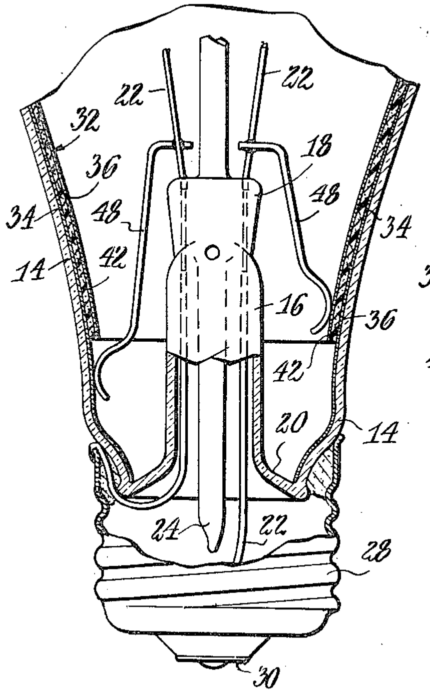
FIG. 5.
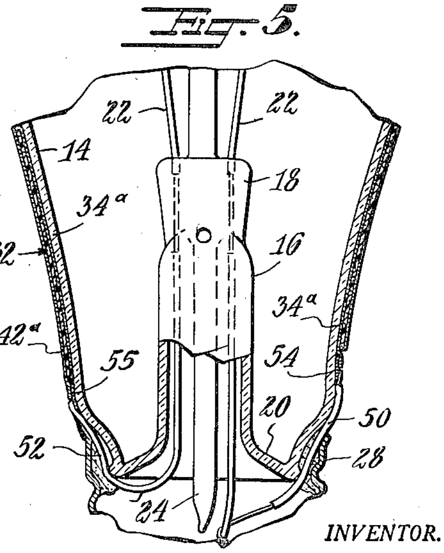
INVENTOR.
E. G. F. ARNOTT.
BY [signature]
ATTORNEY.

United States Patent Office 2,780,746

Patented Feb. 5, 1957

2,780,746

INCANDESCENT-ELECTROLUMINESCENT LAMP

Edward G. F. Arnott, Upper Montclair, N. J., assignor to Westinghouse Electric Corporation, East Pittsburgh, Pa., a corporation of Pennsylvania Application October 1, 1953, Serial No. 383,662

10 Claims. (Cl. 313—109)

This invention relates to lamps and, more particularly, to an incandescent-electroluminescent lamp.

G. Destriau in New Phenomenon of Electrophotoluminescence, "Philosophical Magazine," October 1947, vol 38, pages 700–737, discloses, at pages 726–730, that the brightness of an electroluminescent cell is increased with increasing absolute temperature of the cell. Destriau attributes this phenomenon to the fact that the threshold of visible luminescene for an electroluminescent cell is lower at higher temperatures.

In incandescent lamps a large percentage of the energy consumed is passed off as infrared radiation and is thus lost, and in the average incandescent lamp, the temperature of the lamp envelope will fall within the 75° C.–200° C. range. It is thus the general object of my invention to effectively utilize a portion of the infrared energy generated by an incandescent source.

It is a further object of my invention to provide an incandescent-electroluminescent lamp wherein the infrared radiation from the incandescent source enhances the radiation from the electroluminescent source.

It is another object of my invention to provide an incandescent-electroluminescent lamp wherein the visible output from the two light sources embodied in the lamp are additive.

It is still another object of my invention to provide an incandescent-electroluminescent lamp wherein the light from the incandescent source may be color corrected by the light from the electroluminescent portion of the lamp.

The aforesaid objects of the invention, and other objects which will become apparent as the description proceeds, are achieved by forming an electroluminescent lamp on the envelope of an incandescent lamp so that the infrared energy generated by the incandescent filament will raise the operating temperature of the electroluminescent lamp and thus increase the brilliancy of the electroluminescent portion of the lamp. In addition, the electroluminescent portion of the lamp may be used to color correct the incandescent portion of the lamp by the addition of blue or blue-green electroluminescent radiation.

For a better understanding of the invention, reference should be had to the accompanying drawings, wherein:

Fig. 1 is an elevational view, partly in section, of an incandescent-electroluminescent lamp;

Fig. 2 is a fragmentary enlargement of a section of the lamp envelope, as illustrated in Fig. 1;

Fig. 3 is an alternative embodiment of my invention, corresponding to Fig. 2, wherein the electroluminescent portion of the lamp is fabricated on the outer surface of the lamp envelope;

Fig. 4 is a fragmentary enlargement, partly in section, of the neck and base portion of the lamp shown in Fig. 1, which illustrates one mode of making electrical connection for the electroluminescent portion of the embodiment of the lamp as illustrated in Fig. 2;

Fig. 5 is a fragmentary enlargement, corresponding to Fig. 4, which illustrates one mode of effecting electrical connection for the electroluminescent portion of the alternative embodiment of the lamp as illustrated in Fig. 3;

Fig. 6 is a fragmentary enlargement, similar to Fig. 3, representing an alternative embodiment of the electroluminescent portion of the lamp illustrated in Fig. 3;

Although the principles of the invention are broadly applicable to any light source in which the infrared radiation from the primary source is used to enhance the brilliancy of an electroluminescent lamp, the invention is usually employed in conjunction with an incandescent lamp and hence it has been so illustrated and will be so described.

With specific reference to the form of the invention illustrated in the drawings, the numeral 10 indicates the lamp generally, comprising an envelope consisting of a bulb portion 12 and a neck portion 14 and having a reentrant stem press 16 hermetically sealed to the envelope neck portion 14.

The reentrant stem press 16 comprises a press portion 18, flare portion 20, which is sealed to the envelope neck, and lead-in conductors 22 sealed through the stem press. A tipped-off exhaust tubulation 24 is also included, as is usual in the lamp art. The lead-in conductors 22 extend inwardly within the envelope and support a refractory metal filament 26 between their inwardly extending extremities.

An electrical contact adapting base, which comprises a shell portion 28 and an eyelet 30 insulated from the shell, is attached to the envelope neck portion 14. One of the lead-in conductors 22 makes electrical contact with the eyelet 30 and the other lead-in conductor 22 makes electrical contact with the base shell 28 which shell and eyelet are adapted for making electrical contact with a source of electrical energy (not shown).

In such an incandescent lamp, as described, which lamp is quite common, the lead-in conductors 22 may be of copper or nickel-plated iron. The filament 26 may be fabricated of tungsten and the envelope and stem press of soft glass. The portion of the lead-in conductors 22 which pass through the stem press may be provided with a sheath of copper to facilitate sealing, as is common. The lamp base shell 28 and eyelet 30 may be fabricated of brass or aluminum and the lead-in conductors 22 may be soldered or welded to these to make electrical contact. As is common, the lamp envelope encloses a substantially oxygen-free atmosphere which may either consist of an inert gas or a partial vacuum.

The bulb portion 12 of the envelope constitutes a foundation glass for an electroluminescent lamp 32 which may be fabricated on the inner surface of the envelope bulb as illustrated in Fig. 2. The electroluminescent lamp may consist of a first conductive layer 34 coated on and adhering to the envelope bulb inner surface with a phosphor-dielectric layer 36 consisting of a phosphor 38 embedded in a dielectric 40 coated thereover and adhering thereto. A second electrically conductive layer 42 is coated over and adheres to the phosphor-dielectric layer 38 to complete the electroluminescent lamp.

The two conductive layers 34 and 42 must be transparent and should preferably be relatively thin. In the embodiment as illustrated, these layers may be fabricated of tin oxide of a thickness of about 0.00006 cm., if desired, although the material or thickness is in no way critical.

The phosphor 38, which is embedded in the dielectric 40 to form the phosphor-dielectric layer 36 may be a mixture of field-responsive zinc oxide and zinc sulphide, activated by copper, as indicated on page 710 of the aforementioned Destriau publication. As an example, the 75% zinc oxide, 25% zinc sulphide, copper activated phosphor as indicated by Destriau, may be used, if desired.

The dielectric 40 in which the phosphor is embedded to form the phosphor-dielectric layer 36 must be light transmitting, have a relatively high dielectric constant, must not deform below about 200° C. and must be capable of application to the lamp envelope. There are numerous different types of dielectrics which meet these requirements, an example being a light transmitting polymonochlorotrifluoroethylene, as marketed by M. W. Kellogg Co., Jersey City, New Jersey, under the trademark "Kel-F." Also satisfactory as a dielectric would be light-transmitting polytetrafluoroethylene compounds, an example of such a compound being marketed by E. I. du Pont de Nemours & Co., Inc., Wilmington, Delaware, under the trademark "Teflon." A further general class of compounds which could be used as a dielectric are phenyl methyl silicones having an organic group to silicon ratio of approximately 1.5 to 1. Such compounds are marketed as varnishes by several commercial suppliers under the general descriptive term, silicones.

As shown in Fig. 3, the electroluminescent portion of the lamp may be fabricated on the outer surface of the envelope, as well as on the inner surface. Also the phosphor 38 and dielectric 40 may be applied as two separate coatings, comprising a separate layer 44 of phosphor and a separate dielectric layer 46. In such a lamp the phosphor layer 41 will lie adjacent to one of the electrodes 34ª or 42ª and the phosphor and electrode may be so selected that the material of which the electrode is comprised is capable of activating the phosphor, as outlined in the copending application of Robert B. Windsor, Ser. No. 302,781, filed August 5, 1952, and assigned to the present assignee.

Shown in Fig. 4 is one method of making the electrical connection for the electroluminescent portion of the lamp when such portion is fabricated on the inner surface of the envelope bulb, as shown in Fig. 2. As illustrated, the electrical conductive layer 34 adjacent the inner envelope surface extends further down the lamp neck 14 than the second electrically conductive layer 42. Spring-type electrical contacts 48 connect the electroluminescent lamp electrodes 34 and 42 with the lead-in conductors 22.

Shown in Fig. 5 is one method of making the electrical connection for the electroluminescent portion of the lamp when such portion is fabricated on the outer surface of the envelope bulb, as shown in Fig. 3. The conductive layer 34ª which is adjacent the envelope bulb is electrically connected by a lead 50 to the lamp base eyelet 30 which connecting lead is necessarily insulated from the lamp base shell by conventional insulating means, and since the electrode 34ª is at relatively high potential, it is desirable that the lead connection 50 be well insulated wherever it is exposed to possible contact by the user of the lamp. The other electrode 42ª is electrically connected to the base shell 28 by a conventional connecting lead 52, and this electrode should be maintained at ground potential to avoid shock hazard. Also, the lamp line (not shown) should be polarized to insure that the electrode 42ª is always maintained at ground potential. Alternately, a thin transparent layer of insulating material, such as a silicone, could be applied over the outer electrode to insure against shock hazard.

It should be noted that in the embodiments as illustrated in Figs. 2, 3, 4, 5 and 6, the phosphor may either be embedded throughout the dielectric, or the phosphor and dielectric may be applied in separate layers. It does not matter whether the separate phosphor layer or separate dielectric layer lies adjacent to the electrically conductive coating which is adjacent the envelope bulb, and as shown in Fig. 6, the phosphor layer 44ª may be positioned adjacent the second conductive layer 42ª and the dielectric layer 46ª may be positioned adjacent the first conductive layer 34ª.

Incandescent lamps are notably deficient in the blue and blue-green range of the visible spectrum. In order to color correct the spectral distribution of an incandescent-electroluminescent lamp, as heretofore described, the zinc sulphide-zinc oxide, copper activated phosphor may be replaced by a zinc sulphide, copper activated phosphor or a zinc sulphide phosphor activated with $10^{-3}$ moles copper and $10^{-5}$ moles lead. The former phosphor electroluminesces with a predominance of blue radiation and the latter electroluminesces with a predominance of blue-green radiation. These zinc sulphide phosphors which may be used to supply blue or blue-green radiation are relatively well-known and are described in Waymouth, J. R.; "Optical measurements on electroluminescent zinc sulphide," Journal of the Electrochemical Society, 100, No. 2, 81 (February 1953), and Homer, H. H.; Rúlon, R. M; and Butler, K. H.; "Electroluminescent zinc sulphide phosphors," Abstracts of Electrochemical Society, N. Y. Meeting, April 1953.

In fabricating my incandescent-electroluminescent lamp, I first fabricate the electroluminescent portion of the lamp on the envelope. The electrically conductive layer which is adjacent the envelope wall is applied first, by depositing a very thin coating of metallic tin by well-known vacuum-metallizing techniques and then passing a warm stream of oxygen over this very thin tin layer to convert it to the oxide. In vacuum-metallizing the metal to be deposited is placed in a tungsten filament or boat. The boat and the object to be metallized are then placed in a partial vacuum and the boat is electrically heated to the boiling point of the metal to be deposited. Other metals such as zinc, cadmium, antimony and bismuth can also be used to produce the conductive layers. The phosphor-dielectric is then applied over this first conductive layer and the second conductive layer is then applied over the phosphor-dielectric by the vacuum metallizing-oxidizing technique heretofore described.

The phosphor-dielectric may be applied by any one of several methods. If the phosphor is to be embedded in the dielectric, the phosphor and dielectric are first thoroughly mixed. If the dielectric consists of a polymonochlorotrifluoroethylene, for example, the mixture of phosphor and dielectric may be suspended in a volatile vehicle such as xylene which is sprayed over the first electrically conductive coating. After drying out the vehicle, the phosphor-dielectric is baked at a temperature of about 475° F. in order to cure the dielectric. It is preferable that the surface be slightly roughened in order to enable the dielectric to better adhere and this may be accomplished, if desired, by etching the glass envelope by conventional glass etching means before applying the first electrically conductive coating. If it is desired to use silicones as the dielectric, the phosphor impregnated silicone varnish is sprayed, flushed or painted onto the bulb and the resulting coating is cured by baking it at approximately 250° F. for about 8 hours. If the phosphor and dielectric are to be applied in two separate layers, the dielectric may be applied in exactly the same manner as heretofore outlined, where the phosphor is embedded in the dielectric. The phosphor may be separately applied by dusting or by suspending the phosphor in a medium of nitrocellulose and butyl acetate and baking out the nitrocellulose binder, or by other conventional means of applying a phosphor coating to a surface. Of course it is necessary to mask with masking tape or other suitable masking means, that portion of the envelope which is not desired to coat and these masking techniques may be utilized in applying both of the electrically conductive coatings and the phosphor-dielectric coating.

After the electroluminescent portion of my lamp has been fabricated, the prefabricated reentrant stem press 16 is inserted into the neck 14 of the envelope and the stem press flare 20 is sealed to the base of the envelope neck. In the case of the embodiment as shown in Figs. 2 and 4, electrical connections for the electroluminescent lamp will be automatically made by the spring type electrical contacts 48 upon insertion of the stem press into the neck. In the case of the embodiment as shown in Figs. 3 and 5, electrical contact between the electroluminescent portion of the lamp and the electrical contact adapting base can be made when the lamp base is attached to the lamp neck.

It may be desirable to provide small electrical connection contact areas 54 and 55 on the electrically conductive coatings $34^a$ and $42^a$ to facilitate electrical connection to the connecting leads. Such contact areas may be formed before fabricating the electroluminescent portion of the lamp by painting the area to which connection is to be made with a silver powder suspended in a binder of nitrocellulose. The "paint" is then baked at 500° C. to bake out the binder, and the baked silver is copper plated by conventional plating means, to which copper plate the connecting leads 50 and 52 can be soldered. In such a construction the phosphor-dielectric would necessarily extend a short distance further down the neck of the bulb than the electrode $34^a$ adjacent the envelope. The other electrode $42^a$ would necessarily extend a short distance further down the neck of the bulb than the phosphor-dielectric so as to contact its electrical connection contact area 55. Since the phosphor-dielectric completely covers the electrode $34^a$ adjacent the envelope, including the bottom extremity of this electrode, the two electrodes are insulated from each other even though their electrical contact areas 54 and 55 are both formed on the envelope.

In sealing the stem press flare to the lamp neck, it is necessary to use relatively high temperatures in order to satisfactorily fuse the glass. In order to prevent damage to the electroluminescent portion of the lamp during this sealing-in process, an automatic heat baffle as described in U. S. Patent No. 2,691,850 to Eber and Storms and assigned to the present assignee, may be utilized. The lamp is then evacuated through the exhaust tubulation, inert gases are inserted if desired, and the exhaust tubulation is tipped off, as is conventional in the lamp making art. The lamp base is then attached to the neck of the lamp by basing cement as is customary, and the lead-in conductors 22 are soldered to the lamp base shell 28 and eyelet 30.

It should be noted that such an incandescent-electroluminescent lamp is particularly adapted for use with that type of electroluminescent phosphors which may be further sensitized when operated in a vacuum, as disclosed in copending application of Luke Thorington, Ser. No. 276,421, filed March 13, 1952, and assigned to the present assignee.

It will be recognized that the objects of the invention have been achieved by the provision of an incandescent-electroluminescent lamp wherein the brilliancy of the electroluminescent portion of the lamp is increased by the heretofore unused infrared radiation generated by the incandescent portion of the lamp. In addition, the incandescent portion of the lamp may be color corrected, if desired, by the electroluminescent portion of the lamp.

It should be realized that an electroluminescent lamp can be fabricated on the envelope, or equivalent portion, of any light source which generates unused infrared radiation, in order to enhance the brillancy of the electroluminescent lamp and to enhance the overall brilliance of the combined light sources, and in any of the normally used lighting devices the envelope of the lamp will always be in receptive proximity to the light source to receive the infrared radiation generated by said source.

It should also be realized that it is possible to color correct the incandescent-electroluminescent lamp in such a manner as to achieve special colors for decorative and other purposes.

While in accordance with the patent statutes one best known embodiment of my invention has been illustrated and described in detail, it is to be particularly understood that the invention is not limited thereto or thereby.

I claim:

1. An incandescent-electroluminescent lamp comprising, an electroluminescent lamp fabricated on the envelope of an incandescent lamp having a refractory metal filament adapted to be energized to incandescence and to produce infrared radiation, said electroluminescent lamp comprising a first light-transmitting electrically conductive layer coated on and adhering to said incandescent lamp envelope, a field-responsive phosphor and a light-transmitting dielectric capable of withstanding temperatures of about 200° C. coated over and adhering to said first electrically conductive layer, said phosphor characterized by having an electroluminescent brightness which increases as it is heated, a second light-transmitting electrically conductive layer coated over and adhering to said phosphor-dielectric, and said electroluminescent lamp being in receptive proximity to said refractory metal filament to receive infrared radiation from said filament when said filament is energized.

2. An incandescent-electroluminescent lamp comprising, an electroluminescent lamp fabricated on the envelope of an incandescent lamp having a refractory metal filament adapted to be energized to incandescence and to produce infrared radiation, said envelope having outer and inner surfaces, said electroluminescent lamp comprising a first light-transmitting electrically conductive layer coated on and adhering to said incandescent lamp envelope inner surface, a field-responsive phosphor and a light-transmitting dielectric capable of withstanding temperatures of about 200° C. coated over and adhering to said first electrically conductive layer, said phosphor characterized by having an electroluminescent brightness which increases as it is heated, a second light-transmitting electrically conductive layer coated over and adhering to said phosphor-dielectric, and said electroluminescent lamp being in receptive proximity to said refractory metal filament to receive infrared radiation from said filament when said filament is energized.

3. An incandescent-electroluminescent lamp comprising, an electroluminescent lamp fabricated on the envelope of an incandescent lamp having a refractory metal filament adapted to be energized to incandescence and to produce infrared radiation, said envelope having outer and inner surfaces, said electroluminescent lamp comprising a first light-transmitting electrically conductive layer coated on and adhering to said incandescent lamp envelope outer surface, a field-responsive phosphor and a light-transmitting dielectric capable of withstanding temperatures of about 200° C. coated over and adhering to said first electrically conductive layer, said phosphor characterized by having an electroluminescent brightness which increases as it is heated, a second light-transmitting electrically conductive layer coated over and adhering to said phosphor-dielectric, and said electroluminescent lamp being in receptive proximity to said refractory metal filament to receive infrared radiation from said filament when said filament is energized.

4. An incandescent-electroluminescent lamp comprising, an electroluminescent lamp fabricated on the envelope of an incandescent lamp having a refractory metal filament adapted to be energized to incandescence and to produce infrared radiation, said electroluminescent lamp comprising a first light-transmitting electrically conductive layer coated on and adhering to said incandescent lamp envelope, a field-responsive phosphor embedded in a light-transmitting dielectric capable of withstanding temperatures of about 200° C. coated over and adhering to said first electrically conductive layer, said phosphor characterized by having an electroluminescent brightness which increases as it is heated, a second light-transmitting electrically conductive layer coated over and adhering to said phosphor-dielectric, and said electroluminescent lamp being in receptive proximity to said refractory metal filament to receive infrared radiation from said filament when said filament is energized.

5. An incandescent-electroluminescent lamp comprising, an electroluminescent lamp fabricated on the envelope of an incandescent lamp having a refractory metal filament adapted to be energized to incandescence and to produce infrared radiation, said electroluminescent lamp comprising a first light-transmitting electrically conductive layer coated on and adhering to said incandescent lamp envelope, a layer of field-responsive phosphor coated over and adhering to said first electrically conductive layer, said phosphor characterized by having an electroluminescent brightness which increases as it is heated, a layer of a light-transmitting dielectric coated over and adhering to said phosphor layer, a second light-transmitting electrically conductive layer coated over and adhering to said dielectric, and said electroluminescent lamp being in receptive proximity to said refractory metal filament to receive infrared radiation from said filament when said filament is energized.

6. An incandescent-electroluminescent lamp comprising, an electroluminescent lamp fabricated on the envelope of an incandescent lamp having a refractory metal filament adapted to be energized to incandescence and to produce infrared radiation, said electroluminescent lamp comprising a first light-transmitting electrically conductive layer coated on and adhering to said incandescent lamp envelope, a layer of a light-transmitting dielectric capable of withstanding temperatures of about 200° C. coated over and adhering to said first electrically conductive layer, a field-responsive phosphor coated over and adhering to said dielectric, said phosphor characterized by having an electroluminescent brightness which increases as it is heated, a second light-transmitting electrically conductive layer coated over and adhering to said phosphor, and said electroluminescent lamp being in receptive proximity to said refractory metal filament to receive infrared radiation from said filament when said filament is energized.

7. An incandescent-electroluminescent lamp comprising, an electroluminescent lamp fabricated on the envelope of an incandescent lamp having a refractory metal filament adapted to be energized to incandescence and to produce infrared radiation, said electroluminescent lamp comprising a first light-transmitting electrically conductive layer coated on and adhering to said incandescent lamp envelope, a field-responsive phosphor and a light-transmitting dielectric capable of withstanding temperatures of about 200° C. coated over and adhering to said first electrically conductive layer, said phosphor characterized by having an electroluminescent brightness which increases as it is heated, a second light-transmitting electrically conductive layer coated over and adhering to said phosphor-dielectric, said electroluminescent lamp being in receptive proximity to said refractory metal filament to receive infrared radiation from said filament when said filament is energized, and said phosphor being a zinc sulphide phosphor capable of electroluminescing with a predominance of blue radiation.

8. An incandescent-electroluminescent lamp comprising, a transparent envelope having a bulb and a neck and a reentrant stem press sealed to said neck, said envelope enclosing a substantially oxygen-free atmosphere, an electrical contact adapting base attached to said neck and having electrical contacts insulated from one another, lead-in conductors electrically connected to said base electrical contacts, sealed through said stem press and supporting a refractory metal filament within said envelope bulb, said filament adapted to be energized to incandescence and to produce infrared radiation, said envelope bulb comprising a backing plate for an electroluminescent lamp, said electroluminescent lamp comprising a first light-transmitting electrically conductive layer coated on and adhering to said backing plate, a field-responsive phosphor embedded in a light-transmitting dielectric capable of withstanding temperatures of about 200° C. coated over and adhering to said first electrically conductive layer, said phosphor characterized by having an electroluminescent brightness which increases as it is heated, a second light-transmitting electrically conductive layer coated on and adhering to said phosphor-dielectric layer, said first electrically conductive layer being electrically connected to one of said base electrical contacts, said second electrically conductive layer being electrically connected to another of said base electrical contacts, and said electroluminescent lamp being in receptive proximity to said refractory metal filament to receive infrared radiation from said filament when said filament is energized.

9. An electrical contact for the electroluminescent portion of an incandescent-electroluminescent lamp comprising, an electroluminescent lamp fabricated on the envelope of an incandescent lamp having a refractory metal filament supported within said envelope by lead-in conductors, said electroluminescent lamp comprising a first light-transmitting electrically conductive layer coated on and adhering to said incandescent lamp envelope, a field-responsive phosphor and a light-transmitting dielectric capable of withstanding temperatures of about 200° C. coated over and adhering to said first electrically conductive layer, said phosphor characterized by having an electroluminescent brightness which increases as it is heated, a second light-transmitting electrically conductive layer coated over and adhering to said phosphor-dielectric, said first electrically conductive layer being electrically connected to one of said lead-in conductors, and said second electrically conductive layer being electrically connected to the other of said lead-in conductors.

10. An electrical contact for the electroluminescent portion of an incandescent-electroluminescent lamp comprising, an electroluminescent lamp fabricated on the inner surface of the envelope of an incandescent lamp having a refractory metal filament supported within said envelope by lead-in conductors, said electroluminescent lamp comprising a first light-transmitting electrically conductive layer coated on and adhering to the inner surface of said incandescent lamp envelope, a field-responsive phosphor and a light-transmitting dielectric capable of withstanding temperatures of about 200° C. coated over and adhering to said first electrrically conductive layer, said phosphor characterized by having an electroluminescent brightness which increases as it is heated, a second light-transmitting electrically conductive layer coated over and adhering to said phosphor-dielectric, said first electrically conductive layer being coated over a greater portion of said envelope than said second electrically conductive layer, a first spring-type electrical connector carried by one of said lead-in conductors and making electrical contact with said first electrically conductive layer, and a second spring-type electrical connector carried by the other of said lead-in conductors and making electrical contact with said second electrically conductive layer.

References Cited in the file of this patent

UNITED STATES PATENTS

| | | |
|---|---|---|
| 1,275,890 | Flannery et al. | Aug. 13, 1918 |
| 1,636,970 | Sulzberger | July 26, 1927 |
| 2,265,396 | Reger | Dec. 9, 1941 |
| 2,566,349 | Mager | Sept. 4, 1951 |
| 2,714,683 | Jenkins | Aug. 2, 1955 |